United States Patent [19]

Casper et al.

[11] Patent Number: 4,477,895

[45] Date of Patent: Oct. 16, 1984

[54] SYNCHRONIZED PROTECTION SWITCHING ARRANGEMENT

[75] Inventors: Paul W. Casper; James W. Toy, both of Melbourne; Fred J. Orlando, Jr., West Melbourne; Ronald R. Giri, Melbourne, all of Fla.

[73] Assignee: Harris Corporation, Melbourne, Fla.

[21] Appl. No.: 319,999

[22] Filed: Nov. 10, 1981

Related U.S. Application Data

[63] Continuation of Ser. No. 146,340, May 2, 1980, abandoned.

[51] Int. Cl.$^3$ ............................................. H04B 1/74
[52] U.S. Cl. ............................. 370/16; 179/175.3 S; 371/8; 371/68
[58] Field of Search ................ 371/8, 68; 370/16, 13; 179/175.3 S; 375/118

[56] References Cited

U.S. PATENT DOCUMENTS

| | | |
|---|---|---|
| 3,213,370 | 10/1965 | Featherston . |
| 3,603,736 | 9/1971 | Morroll ................................. 370/16 |
| 3,611,435 | 10/1971 | Cooper . |
| 3,681,694 | 8/1972 | Sarati . |
| 3,878,463 | 4/1975 | Lanigan . |
| 3,887,769 | 6/1975 | Cichetti, Jr. et al. . |
| 4,052,670 | 10/1977 | Watanabe et al. . |
| 4,083,009 | 4/1978 | Bickford et al. . |
| 4,234,956 | 11/1980 | Adderley et al. ........................ 371/8 |

Primary Examiner—Joseph A. Orsino, Jr.
Attorney, Agent, or Firm—Antonelli, Terry & Wands

[57] ABSTRACT

A multichannel data link switching control arrangement for synchronizing the substitution of one data channel for another without causing the insertion or deletion of data bits from the data transmitted over the communication path that is coupled to the channels. The switching control arrangement monitors the relative timing between the data on a channel to be replaced and the data on the replacement channel. Precisely controlled delay circuitry delays the data on one channel relative to the other until the data signals on the two channels are within ± a quarter bit of each other, at which time the channel substitution is effected.

The arrangement includes a pair of control switch units each of which may be selectively controlled to couple either the active channel or the replacement channel to an output communication link. Each switch control unit contains an input multiplexer and an output switch, the operations of which are controlled by a data timing monitoring apparatus or control unit. The outputs of the two switch control units are coupled to signal combining and splitting circuitry the output of which may be phase compared with the data being coupled through either switch unit. A controllable data delay unit is coupled to one channel at the input to the dual switch control unit configuration and serves to selectively delay one channel with respect to the other as the data signals on both are applied to respective switch control units until the data streams on the two channels are synchronized. At that time, a control signal is applied to the two switch control units to effect a simultaneous switching of the output switches in each unit, whereby channel substitution is effected. The delay action of the delay unit remains in the replacement channel, except that no further incrementing of the delay is carried out.

22 Claims, 6 Drawing Figures

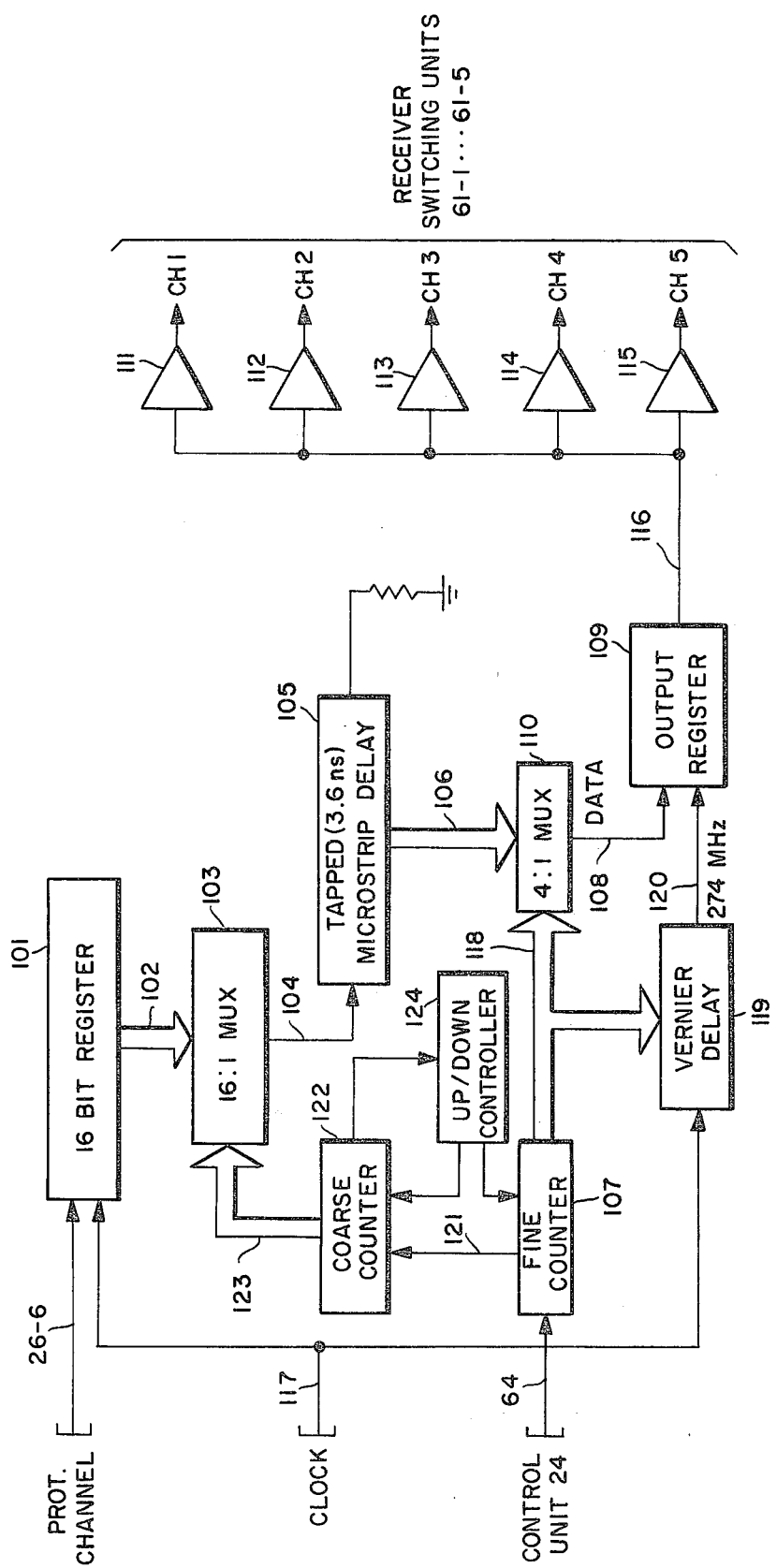

SYNCHRONIZED PROTECTION SWITCHING ARRANGEMENT

This is a continuation of application Ser. No. 146,340 filed May 2, 1980, now abandoned.

FIELD OF THE INVENTION

The present invention relates to communication systems and is particularly directed to a communication path switching arrangement for controlling the selective substitution of high data rate digital data signals transmitted on one communication channel in place of those transmitted on another channel via the same data communication highway without a loss or addition of data bits.

BACKGROUND OF THE INVENTION

With the advance and development of sophisticated communication techniques, especially those involving considerably high data rates as may be encountered in high speed digital communication networks, particularly high speed optical digital communication systems, spare capacity or backup facilities are usually made a part of the network, in order to provide the network with the capability of maximizing the integrity of communication paths through it in the event of an outage or failure of an active communication link. A common solution to the problem of channel faults or data degradation is the provision of one or more protection channels that are normally maintained in a quiescent or standby condition; in response to instructions from channel monitoring equipment a protection channel may be substituted in place of an active channel that has been observed to have developed a fault or an adverse thruput condition that has led or could lead to a loss of data communication over the system.

Concomitant with the provision of such protection channel equipment is the need to ensure that the substitution of one channel for another is effected rapidly and without adversely affecting the data being transmitted over the channel. For low data rates the time window within which the channel substitution may occur permits a considerably wider error margin and does not necessarily require an observation of the clock signals themselves during the switching process. However, with the very high data rates of present day communication systems (e.g. 200–300 Mb/s) the degree of freedom allowed in switching between channels is significantly restricted. Still, as the demand for information transmission continuity is of paramount importance, some scheme must be provided to accurately control, within an extremely fine error window, the time at which the substitution of one channel for another is effected.

One such communication system in which the need arises is described in copending patent application Ser. No. 149,291, filed May 12, 1980, entitled Multi-channel, Repeatered, Fiber Optic Communication Network Having Fault Isolation System by P. Casper et al, and assigned to the assignee of the present application. The communication network described in that application employs a plurality of normally active optical communication channels each of which carries high speed (301 Mb/s) digital data, such as digital telephone traffic. One or more protection channels are provided to carry the digital traffic in the event of a detected problem with the normally active data channels. Advantageously, as described in that application, a channel switching system of the type to be explained in detail below is incorporated in the network in order that what is termed "hitless" switching between the active and protection channels may be effected. By "hitless" switching is meant the substitution of one data channel for another without the addition of or deletion of data bits from the link. Of course, this "hitless" or synchronized switching technique has applicability to data communications other than that described in the above cited application; and it is to be understood, therefore, that reference to such a network is not to be considered limitative of the invention but merely to illustrate an exemplary environment in which the present invention may be incorporated.

SUMMARY OF THE INVENTION

In accordance with the present invention, there is provided a multichannel data link switching control arrangement for synchronizing the substitution of one data channel for another without causing the insertion or deletion of data bits from the data transmitted over the communication path that is coupled to the channels. The switching control arrangement monitors the relative timing between the data on a channel to be replaced and the data on the replacement channel. Precisely controlled delay circuitry is provided so as to delay the data on one channel relative to the other until the data signals on the two channels are within ±a quarter bit of each other, at which time the channel substitution is effected.

For this purpose the arrangement includes a pair of control switch units each of which may be selectively controlled to couple either the active channel or the protection channel to an output communication link. Each switch control unit contains an input multiplexer and an output switch, the operations of which are controlled by a data timing monitoring apparatus or control unit. The outputs of the two switch control units are coupled to signal combining and splitting circuitry the output of which may be phase compared with the data being coupled through either switch unit. A controllable data delay unit is coupled to one channel at the input to the dual switch control unit configuration and serves to selectively delay one channel with respect to the other as the data signals on both are applied to respective switch control units.

The data in the channel to act as the replacement channel is coupled through the delay unit and phase compared with the data in the channel to be replaced. As long as there is a phase difference between the data bits on the two incoming channels to the switch control unit, the controlled delay action of the delay unit is incremented, by one-quarter bit segments, until the data streams on the two channels are adequately synchronized. At that time, a control signal is applied to the two switch control units to effect a simultaneous switching of the output switches in each unit, whereby channel substitution is effected. The delay action of the delay unit remains in the replacement channel, except that no further incrementing of the delay is carried out.

BRIEF DESCRIPTION OF THE DRAWINGS

FIG. 6 is a detailed block diagram of the constituent components of the data delay circuit of FIG. 3.

DETAILED DESCRIPTION

Figure 1:
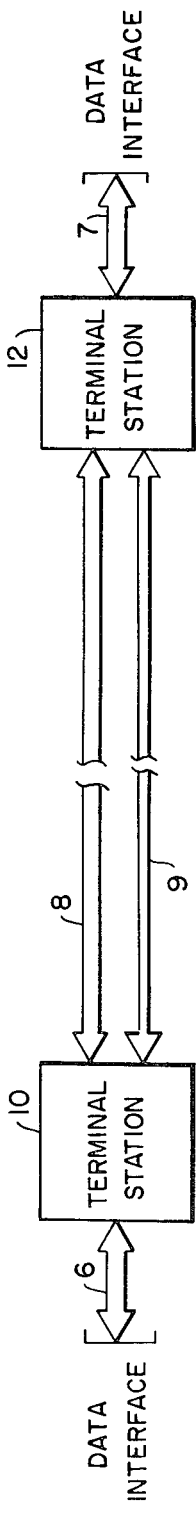
FIG. 1 is a block diagram of a multichannel communication network.

Referring now to FIG. 1, there is shown a simplified block diagram of a multichannel communication network having a plurality of normally active data channels and one or more protection channels. For purposes of facilitating the description of the network, the network will be assumed to be reduced to a configuration having a plurality of normally active channels 8 and a single protection channel 9 interconnecting a pair of terminal stations 10 and 12 at opposite ends of the network. The terminal stations contain transceiver equipment for coupling digital data signals of the channels of a pair of data interface links 6 and 7 and respective ones of the channels 8 and 9. Each channel is of full duplex configuration having a pair of communication links for conveying data signals in the two directions between terminal stations 10 and 12. One type of high data rate channel link that may be considered is a fiber optic communication link, as described in the above-referenced copending application. For purposes of the present description it will be assumed that each of the channels is configured of pairs of optical fiber strands coupling a pair of separated terminal stations to each other; the system may also include one or more repeaters (not shown) disposed along the channels for signal regeneration as required.

Figure 2:
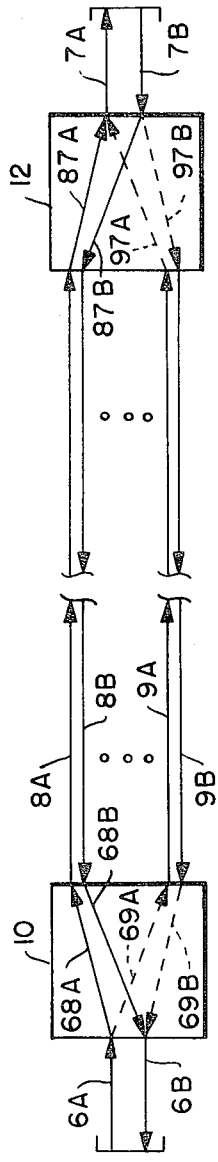
FIG. 2 is a functional block diagram of switchable link portions of several channels of the network shown in FIG. 1.

FIG. 2 illustrates a simplified functional diagram of the controlled switching action that may be performed at each terminal station with respect to a normally active channel and a protection channel. At terminal stations 10 and 12 respective data interface links 6 and 7 are comprised of a pair of data highways 6A, 6B, 7A, 7B over which data signals are coupled between a data interface and the terminal stations. One of the normally active terminal-to-terminal channels contains a pair of highways 8A and 8B, while the protection channel contains highways 9A and 9B. Within the terminal station 10 a pair of data links 68A and 68B couple data highways 6A and 6B to highways 8A and 8B; within terminal station 12 data link pair 87A and 87B coupled data highways 8A and 8B to links 7A and 7B. Through these series of connections the data interfaces, for the channel of interest, at opposite ends of the system are connected to each other. Links 69A, 69B and 97A, 97B, shown in broken lines, represent interconnects that may be placed into service in place of links 68A, 68B and 87A, 87B, thereby coupling data interfaces 6 and 7 together over the protection channel links 9A, 9B. As explained briefly above, the present invention is directed to a scheme for making this substitution without affecting the integrity and quality of the data transmission.

Figure 3:
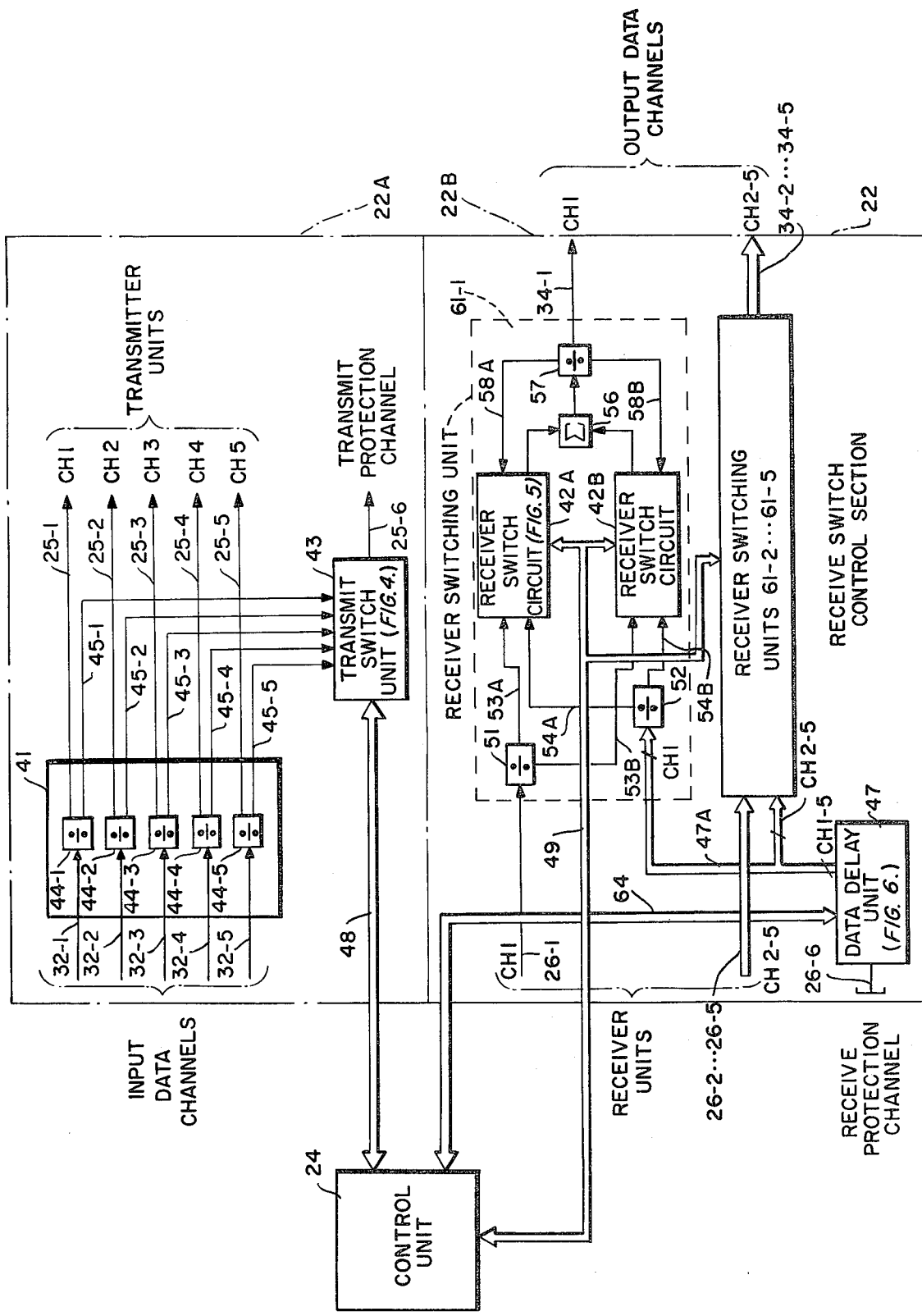
FIG. 3 is a block diagram of a switching control arrangement that may be incorporated in the terminal stations of the communication network shown in FIG. 1.

Referring now to FIG. 3 there is shown a schematic block diagram of an active channel-protection channel switching arrangement that may be employed in each of terminal stations 10 and 12 to control the substitution of the protection channel for one of the other active channels. For purposes of the present description, and continuing with reference to the above-identified copending application as describing an exemplary communication environment in which the present invention may be incorporated, the plurality of normally active channels may comprise five such channels 1-5 supplemented by one protection channel. Each terminal station contains a switching arrangement as shown in FIG. 3 to provide full duplex switching capability for any of the data links of which the terminal-to-terminal channels are comprised. Thus, for a total of six channels in the present exemplary embodiment, there are twelve data link connections that are subject to control, six of which are controlled by a transmit switch 22A control section and six of which are controlled by a receive switch control section 22B. Each of these sections will be discussed individually below. Since the switching control arrangement at each terminal station is the same, only that contained in terminal station 10 will be described in detail.

TRANSMIT SWITCH CONTROL SECTION 22A

Within the transmit switch control section 22A, respective lines 32-1 to 32-5 for incoming digital data signals on channels one to five from a suitable data interface are coupled to respective signal splitters 44-1 to 44-5 of a signal divider 41. Each splitter has a first output line, corresponding to respective lines 25-1 to 25-5, coupled to respective transmitter units for the five active channels, and a second output line, corresponding to respective lines 45-1 to 45-5, coupled to a transmit switch unit 43. Transmit switch unit 43 (to be described in detail below in conjunction with the description of FIG. 4) has a data output line 25-6 coupled to a transmitter unit (not shown) for the protection channel and a control link 48 coupled to a control unit 24 for controlling the action of unit 43. Control unit 24 may comprise either a hardware-implemented unit or part of a software-controlled, microprocessor-based control device that supplies timing and control signals to the various components of the switching arrangement of FIG. 3. For purposes of the present description, control unit 24 may be comprised of combinational logic that responds to prescribed input signals produced by external control devices and by the circuit components of the switching arrangement of FIG. 3 and delivers control and timing signals to operate the components in the manner described. Since the exact logic configuration of which control unit 24 is configured may take many forms, no specific implementation will be set forth. Instead, in order to simplify the description, the input and output signals associated with control unit 24 will be explained, thereby enabling one skilled in the art to implement any suitable logic configuration consistent with the present description.

The purpose of transmit switch control section 22A is to initially place the data, that is being transmitted via the channel being substituted, onto the protection channel at the upstream end of the communication link. Thus, taking as an example, the need to substitute the protection channel link that conveys data from terminal station 10 to terminal station 12 over channel one with the corresponding link of the protection channel, the transmit switch control unit at terminal station 10 serves to connect the incoming data interface link for channel-one to two terminal-to-terminal channels links, that for channel one and that for the protection channel. Downstream, at the receiving end of the link, namely, at terminal station 12, the switching between the protection channel and channel one is controlled in a "hitless" or synchronized manner, in order to achieve the required data transfer between channels that connect to the outgoing data interface of interest.

In the channel substitution switching mode, transmit switch control unit 43 (to be described in detail below with reference to FIG. 4) operates in response to a command on link 48 from control unit 24 to selectively couple one of lines 45-1 to 45-5 to output line 25-6 and thereby to a terminal-terminal transmitter for the protection channel. In this mode, the data for the selected channel is applied from signal divider 41 to two transmitter units—over line 25-1 to the one associated with the replaced normally active channel (e.g. channel-one) and also over line 25-6 to the transmitter unit associated with the protection channel, so that both channels are initially active prior to the synchronized substitution at the receiving end of the link, i.e., at terminal station 12. Once the substitution has been completed, control unit 24 may supply a signal to the transmitter associated with channel-one to inhibit further transmission over the station 10-to-station 12 link of channel-one or insert a predetermined signal onto channel one for test/diagnostic purposes, as described in the above-referenced copending application.

RECEIVE SWITCH CONTROL SECTION 22B

Within the receive switch control section 22B, respective receive lines 26-1 to 26-5 for received signals from receiver units associated with the five normally active channels are coupled to respective receiver switching units 61-1 to 61-5, only unit 61-1 being illustrated in detail so as to simplify the drawing. Receiver switching unit 61-1 includes a first signal divider 51 coupled to channel-one receive line 26-1. Divider 51 couples the data on line 26-1 over lines 53-A and 53-B to respective receiver switch circuits 42-A and 42-B which are controlled via link 49 that is coupled to control unit 24. The circuits are identically configured and normally only one is operated at a time, the other providing a redundant back-up capability. The outputs of receiver switch circuits 42-A and 42-B are combined in adder 56 (although only one output is active at a given instant) and then coupled via signal splitter 57 to output line 34-1. Signal splitter 57 provides a pair of branched signals over lines 58A and 58B to respective phase comparators contained within each of circuits 42A and 42B. The phase comparator is used in conjunction with the synchronization of the switch-over operation between the protection channel and a normally active channel during a "hitless" switching mode of operation to be described below, thereby avoiding a loss of or addition of data, as will be explained more fully below in conjunction with the detailed description of the receive switch circuit illustrated in FIG. 5.

Receive switch control section 22B also includes a data delay unit 47, shown in detail in FIG. 6, which adjusts the phase delay to ±one quarter bit between the data on the protection channel and the data on the normally active channel being replaced. This unit enables a "hitless" switch over between the protection channel and the substituted one of channels one to five without causing a bit insertion into or bit deletion from the traffic data stream. Control of the operation of data delay unit 47 is effected via link 64 which is coupled to control unit 24. The data output from data delay unit 47 is coupled over link 47A to each of receive switching units 61-1 to 61-5. In the detailed illustration of receiver switch unit 61-1, the channel-one output of data delay unit 47 is separated by signal splitter 52 into respective signal branches 54A and 54B coupled to receiver switch circuits 42A and 42B. That one of redundant receiver switch circuits 42A and 42B which has been placed into operation will couple one of lines 53A (53B) or 54A (54B) to output channel line 34-1 in response to signals from control unit 24. Assuming normal operation for channel-one and operation of circuit 42A, the output 53A from splitter 51 would be coupled through receive switch circuit 42A to channel-one output line 34-1. In the event of a failure of channel-one, control unit 24 will be operated to couple control signals over links 49 and 64 to cause the received signal on line 26-6 to be coupled through data delay circuit 47, link 47A to splitter 52, line 54B and circuit 42B to output line 34-1, while the output of receive switch circuit 42A is interrupted.

The channel substitution action is initiated at the upstream end of the network. For the example chosen, this means that terminal station 10 takes action to couple the data on the outgoing channel-one link through its transmit switch control section 22A to the outgoing data link for the protection channel. Once this action is completed the data on channel-one (which is to be replaced by the protection channel) is conveyed from terminal station 10 to terminal station 12 over two links, the channel-one link and the protection channel link, thereby enabling the receiver switch control section 22B at terminal station 12 to monitor the data on both links and effect synchronous switching at the receiving or downstream end of the links as will be explained below.

TRANSMIT SWITCH CONTROL UNIT 43 (FIG. 4)

Figure 4:
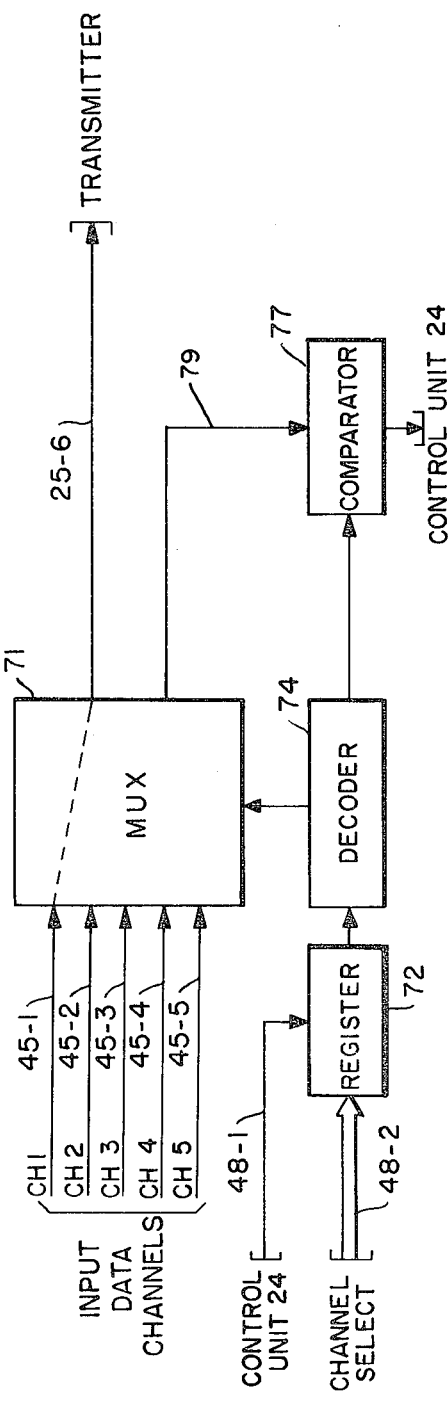
FIG. 4 is a detailed block diagram of the constituent components of the transmit switching section of FIG. 3.

As illustrated in FIG. 4, the five normally active communication channel lines for coupling data to be transmitted, branched from splitters 44-1 to 44-5 (FIG. 3), are supplied over lines 45-1 to 45-5 to a multiplexer 71. As mentioned previously, for purposes of the present description it will be assumed that the terminal station 10-to-terminal station 12 link of channel-one is to be replaced by the corresponding link of the protection channel, so that line 45-1 is to be coupled through multiplexer 71 to output line 25-6. From control unit 24 a binary code (001) indicative of channel-one is coupled over link 48-2 and is strobed into a register 72 in response to a strobe or store enable pulse on line 48-1 from control unit 24. This binary code is decoded into a multiplexer switch selection signal by decoder 74. The output of decoder 74 instructs multiplexer 71 to couple line 45-1 (for channel-one) to output line 25-6. Comparator 77 is coupled to the output 79 of multiplexer 71 which verifies that the channel coupled to output line 25-6 (here, channel-one) is the same channel selected by decoder 74. The output of comparator 77 may be coupled to control unit 24 to verify that the intended switchover through multiplexer 71 has been accomplished. With this action having been taken at terminal station 10, the data from the interface link associated with channel-one is now coupled over the station-to-station links for two channels—channel-one and the protection channel. As a result, the receiver switch control section 22B of terminal station 12 can now take action to substitute the protection channel for channel-one, as will be described in detail below.

RECEIVER SWITCHING UNIT (FIG. 5)

As was described above in conjunction with the description of the switch control arrangement shown generally in FIG. 3, the receive switch control section 22B is comprised of a set of receiver switching units 61-1 . . . 61-5, one for each of normally active data channels, one to five and a data delay unit 47. Each of the receiver switching units serves two functions. In a first mode of operation, termed the static mode, it couples incoming data on either its associated channel (e.g., channel-one for receiver switching unit 61-1) or the protection channel to its output coupling to the data interface. In a second mode of operation, termed the dynamic mode, the receiver switching unit performs a switchover between the protection channel and its associated normally active channel. Moreover, in this second mode of operation the receiver switching unit may be controlled in cooperation with data delay unit 47 (to be described below in conjunction with the description of FIG. 6) to effect a "hitless" mode of switching between the protection channel and the receiver switching unit's associated channel, whereby no data bits are lost or added in the changeover process. This "hitless" switching capability can be omitted, if desired, by directly replacing the protection channel with the normally active channel subject, of course, to a possible loss of data bits.

Figure 5:
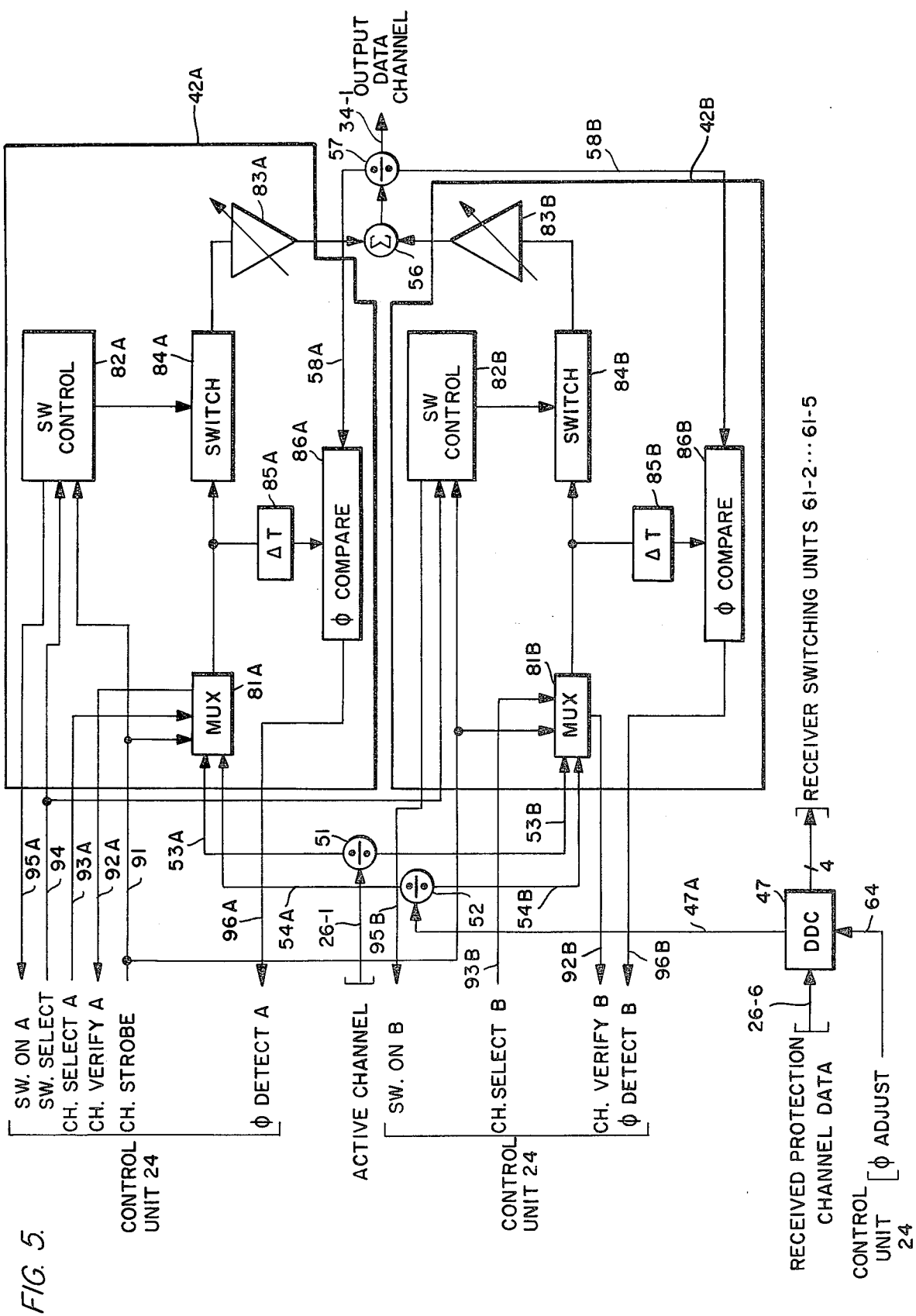
FIG. 5 is a detailed block diagram of the constituent components of the receive switching section of FIG. 3.

Referring now to FIG. 5, there is illustrated a schematic block diagram of a portion of the receiver switch control section 22B, shown in FIG. 3, specifically, the details of an individual receiver switching unit (such as unit 61-1 taken as an example) and the data delay circuit 47. Each receiver switching unit is comprised of a pair of receiver switch circuits 42A and 42B, one of which provides redundancy back-up capability during the static mode of operation of the unit, and both of which are used during the "hitless" dynamic mode of operation of the receiver switching unit, with one switch circuit providing a data path for the normally active channel while the other switch circuit operates in conjunction with data delay circuit 47 to adjust the timing of the data to be coupled through the protection channel, so that a changeover between the protection and normally active channels can be accomplished with no bit slips.

Again considering the circuitry associated with channel-one for purposes of providing an example, the configuration and operation of receiver switching unit 61-1 will be described. Within the receiver switching unit there are a pair of identically configured receiver switch circuits 42A and 42B. As shown in FIG. 5, receiver switch circuit 42A includes a multiplexer 81A the output of which is coupled to a switch 84A and a delay circuit 85A. The output of switch 84A is coupled through controlled gain amplifier 83A to adder 56. Switch 84A is controlled by a switch control circuit 82A. Switch control circuit 82A is coupled to control unit 24 via control lines 91, 94 and 95A. Line 91 couples a channel strobe signal to the switch control circuit in each receiver switch circuit to control the opening and closing of switches 84A and 84B. Line 94 couples a signal designating whether the switch control circuit is to open or close its associated switch. Line 95A is used to advise control unit 24 of the state of switch control circuit 82A. Similarly line 95B couples a signal to the control unit 24 from switch control circuit 82B indicating the state of the circuit.

Further control lines from control unit 24 are coupled to multiplexer 81A. In addition to channel strobe line 91 which controls the switching operation of multiplexer 81A, line 93A couples a signal to multiplexer 81A indicating which of input lines 53A and 54A is to be coupled to the output of the multiplexer. Line 92A couples a signal to control unit 24 from multiplexer 81A indicating the actual coupling state of the multiplexer. An additional control signal line 96A is coupled to control unit 24 from the output of phase comparator 86A, to indicate the phase difference between the output of delay circuit 85A and divider 57 on line 58A. The output of phase comparator 86A is monitored by control unit 24 during "hitless" switching between the protection channel and the normally active channel, as will be explained in detail below in conjunction with the description of the data delay circuit shown in FIG. 6.

Since receiver switch circuit 42B is configured identically as receiver switch circuit 42A, a detailed description of receiver switch circuit 42B will be omitted. Instead, reference will be made to the components of each circuit in the description of the operation below.

OPERATION

As was explained previously, each receive switching unit operates in either a static mode or a dynamic mode. In the static mode, one of the receiver switch circuits 42A, 42B is quiescent or serves as a redundant backup for the other circuit in the event of a failure. Multiplexer 81A (81B) will have been strobed by line 91 and control line 93A (93B) from control unit 24 to couple the output of splitter 51 to switch 84A (84B). Switch control circuit 82A receives signals from the control unit 24 to couple the output of multiplexer 81A through switch 84A and amplifier 83A to summing circuit 56. The output of summing circuit or adder 56 is coupled through divider 57 and over output line 34-1 to the data interface link. With receiver switch circuit 42B in the quiescent mode, switch 84B is open and there is no output supplied to adder 56 from switch 84B, so that adder 56 and divider 57 couple the output of receiver switch circuit 42A alone over line 34-1 to data interface link 7. In the normal operating mode, phase comparator 86A (86B) compares its active channel input to a sample of the output signal from divider 57. Thus, line 96A (96B) sends a signal to control unit 24 indicating the condition of the respective switching unit. In the event of a need to effect a replacement of the normally active receive switch by the rebundant switch, control unit 24 operates in response to input commands and takes the appropriate action to disengage receiver switch circuit 42A and insert receiver switch circuit 42B between the incoming channel and the output line 34-1. For this purpose, switch control circuits 82A and 82B are controlled to open switch 84A and close switch 84B, respectively, in order that service over the link will be maintained.

In the dynamic mode of operation, the receive switching unit operates to switch between the protection channel and a normally active channel. The dynamic mode of operation can be effected in either a "hitless" fashion, or a direct switching fashion (which may result in the loss of data bits). In the latter instance, control unit 24 is instructed by input command signals to simply switch the multiplexer (81A or 81B depending upon which receiver switch circuit is being used) from the active channel to the protection channel, the data on which is then coupled through the receiver switch circuit to adder 56, splitter 57 and out to the data interface 7. Advantageously, however, switching between the normally active channel and the protection channel can be accomplished in a "hitless" fashion wherein, pursuant to the present invention, the data stream on the protection channel and that on the active channel are brought into synchronization with one another within one-quarter of a bit at the time the multiplexer is switched, in order to prevent loss of or insertion of even one bit of data over the link.

In order to implement "hitless" switching in the dynamic mode of operation, a data delay circuit 47 operates to delay the data stream on line 26-6 from the protection channel in a stepwise fashion until the output of the phase comparator (either phase comparator 86A or phase comparator 86B of the protection switch being utilized) indicates proper synchronization of the normally active channel data and the protection channel data.

More specifically, let it be assumed that receiver switch circuit 42A is presently coupling received data on normally active channel one through multiplexer 81A, switch 84A and amplifier 83A to adder 56 and out to signal splitter 57 and output line 34-1. When it is desired to switch between the normally active channel-one and the protection channel, the data stream on channel-one must first be placed on the protection channel. As explained above in conjunction with the description of the transmit switch control section, this action is carried out at the upstream terminal station (i.e., terminal station 10 in the present example). It will be assumed here that this procedure has already taken place in the manner described above so that the data stream of interest on channel-one is also on the protection channel (although the data interface 7 at terminal station 12 is presently receiving only channel one data since the protection channel substitution has not yet been carried out). Now, multiplexer 81B within receiver switch circuit 42B will be instructed by control circuit 24 to switch its output to input line 54B over which the protection channel data is supplied. Switch control circuit 82B will be controlled by the control unit 24 to maintain switch circuit 84B in the open position so that only data on the normally active channel-one continues to be applied to adder 56 and from there to the data interface. The normally active channel data itself is split off from splitter 57 over line 58B to a phase comparator 86B which also receives the protection channel data by way of delay circuit 85B. Phase comparator 86B compares the phase of the protection channel data with that coupled from splitter 57 representative of the channel-one data. A signal indicating an in-phase or out-of-phase condition is coupled over line 96B to control unit 24. As long as the two signals are not within one-quarter bit of phase difference of each other, control unit 24 supplies a phase adjustment signal over line 64 in successive increments of one-quarter bit to the data delay circuit 47. As will be explained below, in conjunction with the description of FIG. 6, data delay circuit 47 operates to incrementally delay the data on the protection circuit by one-quarter of a bit until the protection channel and the normally active channel come within one-quarter bit of being synchronized with one another. Once the phase adjustment signals on line 64 have accomplished this proper synchronization, the output of phase comparator 86B will advise control unit 24 that switching between the normally active channel and the protection channel can take place. With the proper delay having been imparted to the protection channel to insure synchronization and switchover, control unit 24 instructs each of switch control circuits 82A and 82B to change the operation of their respective switches 84A and 84B. At this time, again using the example chosen, switch circuit 84A is opened so as to sever the link between channel-one and adder 56, while switch circuit 84B is closed so as to couple the protection channel through switch 84B to adder 56. As a result, there is no loss of even a single bit of data output over line 34-1 to the data interface. Namely, the changeover between the protection channel and channel-one is accomplished in a "hitless" fashion. The manner in which the data delay circuit accomplishes the incremental delay imparted to the protection channel data will be explained below in conjunction with the description of FIG. 6.

DATA DELAY UNIT (FIG. 6)

As was described above in conjunction with the operation of the receiver switching unit (FIG. 5), in order to effect hitless switching between the protection channel and the normally active channel, a data delay unit 47, shown in detail in FIG. 6, is disposed in the data link between line 26-6 over which the protection channel data is supplied and each of the inputs to the receiver switching units. The data delay unit 47 operates to delay the data on the protection channel in quarter bit increments until synchronization between the normally active channel and the protection channel is achieved, namely, until there is no greater than one quarter bit offset between the two.

For this purpose, as shown in FIG. 6, the input protection channel data on line 26-6 is applied to the data input of a sixteen bit register 101. Register 101 is clocked by a suitable clock (the frequency of which corresponds to the bit rate of the data) on line 117, the clock being synchronized with the incoming data. As input data is applied on line 26-6 to the sixteen bit register 101, it is clocked in, one bit at a time, by the clock on line 117. Register 101 is a serial-in, serial-out shift register with the spilled over bits from the last register being deleted. Each of the successive stages of register 101 is coupled over parallel links 102 to a multiplexer 103. Multiplexer 103 is controlled by a link 123 from a "coarse" counter 122 to selectively couple one of the stages of sixteen bit register 101 to output line 104. Output line 104 is coupled to a delay line 105 which contains taps at quarter bit increments to provide, on output link 106, successively delayed versions of the data bit output of multiplexer 103. One of these delayed bits is coupled through multiplexer 110 under the control of a switch signal on line 118 from a "fine" counter 107 to an output line 108.

Counters 122 and 107 are controlled by an up/down controller 124 which steers the direction in which the contents of counters 122 and 107 are operated. Up/down counters 122 and 107 are incremented for each count signal applied to line 64 until they reach positive capacity at which point they begin counting down to minimum value as controlled by up/down controller 124. Upon reaching its lower limit, controller 124 causes counters 122 and 107 to begin sweeping back in the positive direction. This action on the part of up/down controller 124 causes the control signal on link 123 to switch multiplexer 103 in such a fashion that it sweeps across the stages of register 101 back-and-forth, rather than in only one direction and then immediately back to the beginning. In this manner, counters 121 and 107 are prevented from rolling over so that there is never a loss of data bits applied to and shifted through register 101.

Output line 108 is coupled to the data input terminal of an output register 109. Output register 109 is clocked by a data rate clock on line 120 which is provided by a vernier delay 119 that is clocked by the clock on line 117 but incrementally delayed in accordance with a control signal on link 118 from counter 107. The output of register 109 is coupled over line 116 through successive amplifiers 111 through 115 to link 47A which is coupled to the dividers 52 of each of the switching units 61-1–61-5, described above in conjunction with FIGS. 3 and 5. A phase adjust command signal on line 64 from the control unit 24 is coupled to the fine counter 107 to control the incremental delay operation of the data delay unit.

OPERATION

In order to provide the desired synchronization between a normally active channel and the protection channel, control unit 24 monitors the output of one of the phase comparators 86A, 86B in the receive switching unit under consideration. As was explained above in conjunction with the description of FIG. 5, the output of the phase comparator indicates whether the data on the normally active channel is in-phase with the data on the protection channel. As long as there is a phase difference between the data on the two channels, the phase comparator delivers an output signal to control unit 24 which, in turn, delivers a phase adjust signal to counter 107. Counter 107, is a count-to-four counter which produces an output on line 121 at overflow for every four signals counted on line 64 from control unit 24. Counter 122 counts up to sixteen and then recycles in accordance with the count pulses produced on the line 121 from counter 107. The state of counter 122 governs which of the outputs of register 101 will be coupled through multiplexer 103 to delay line 105.

Assuming that the protection channel and the normally active channel data bits are out of sync with one another, a phase comparison by one the phase comparators in the receive switching unit will produce an output, causing control unit 24 to supply an increment signal to counter 107. Beginning with the first stage of register 101, assuming that counters 122 and 107 are cleared, multiplexer 103 couples the first bit stage to delay line 105 which successively delays the data bit and applies it to multiplexer 110, with four data bits identical to each other but each successively offset from the previous bit by one-quarter bit being applied to the inputs of the multiplexer. Counter 107 initially addresses the first delay tap and causes the data bit to be coupled over line 108 to the output register 109. Delay 119 effects a delay corresponding to that of the delay bit as addressed by counter 107 so that the bit delivered through multiplexer 110 is synchronously clocked into register 109 and delivered over line 47 to divider 52 within each of the receive switching units 61-1 . . . 61-5. If the phase comparison circuit detects that the protection channel and the normally active channel are still out of sync, it delivers an output signal to control unit 24.

In response to this signal, control unit 24 delivers a further pulse signal over line 64 to counter 107 to increment its contents by a count of one and to cause multiplexer 110 to address the next successive input on link 106 from microstrip delay 105. Similarly, delay line 119 responds to the new contents of counter 117 provided on link 118 to delay the clock on line 117 by an amount to synchronously load the next successively delayed bit on line 108 into register 109.

The above process is repeated for each of the quarter bit delays of the presently addressed bit in register 101 and then successively for each additional bit in the same manner, as necessary, for the successive stages of register 101 until the output of the phase comparator within the receive switching unit indicates that the normally active channel and the protection channel are properly timed with one another. At that time, further phase adjust command signals from control unit 24 are inhibited and the contents of counter 107 and counter 122 are no longer incremented. The delay provided by way of register 101 and delay 105 through the data delay unit is now fixed at the proper incremental offset between the normally active channel and the protection channel to insure a "hitless" switchover between the two channels. At this point, the operation described above in conjunction with the description of FIG. 5 for "hitless" switching between the channels may take place.

In the foregoing explanation of the operation of the switching control arrangement of the present invention, the description related to the substitution of the protection channel for one of the normally active channels. With the data delay circuit being disposed in the communication path of the protection channel proper, rapid incremental delay adjustments to the phase of the protection channel data are carried out to bring the protection channel into synchronization with the normally active channel being replaced. When it is desired to switch back to the normally active channel, the adjustment of the incremental delay proceeds fairly slowly since the data output undergoes phase-steps.

More specifically, it is common practice in commercial high data rate data communication networks of the type considered herein to couple communication channel outputs to timing recovery circuitry (usually including a phase-locked loop) to precisely regenerate the data being conveyed. Accordingly, assuming that there is a phase offset between the protection channel and the previously replaced normally active channel (although this is quite unlikely since the down time of the normally active channel should be reasonably brief while the channel should remain synchronized for a number of hours), the control unit 24 causes a gradual incremental change in the protection channel delay. This gradual change (in increments of a quarter of a bit) is quite tolerable because of the action of the timing recovery circuitry which sees this quarter bit delay as jitter on the bit and properly reconstitutes the bit. Eventually, synchronization between the two channels is realized and return to the normally active channel can be effected. It should also be noted that the synchronous hitless switching operation carried out by receiver switch control section 22B need not be associated with the particular type of communication link given in the example chosen. Receiver switch control section 22B is capable of carrying out "hitless" switching between any two data links coupled to receiver switch circuits 42A and 42B, the outputs of which are coupled to a common data line over which the integrity of the incoming data communication is to be maintained.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. For use in a communication system having first and second data links over which data signals may be conveyed to a receiving date output port, an arrangement for controlling the connection of one of said first and second data links to said receiving data output port in place of the other of said first and second data links comprising first and second controlled switching circuits, each having first and second inputs coupled to said first and second data links and an output coupled to said output port, each of said controlled switching circuits including:

first means for selectively providing a signal coupling path for signals applied to one of said first and second inputs to said output port;

second means, coupled to the signal coupling path providing by said first means, for delaying signals applied to said one of said first and second inputs;

third means for comparing the timing relationship between data signals appearing at said output port and signals delayed by said second means; and fourth means, responsive to an output of said third means, for controlling the selective provision of a signal coupling path for signals applied to one of said first and second inputs to said output port.

2. An arrangement according to claim 1, wherein said communication system further includes means, coupled to each of said first and second data links, for selectively coupling the data signals that are to be conveyed over said first data link to said second data link.

3. An arrangement according to claim 1, further comprising:

fifth means, coupled in one of said first and second data links, for controllably delaying signals conveyed thereover in response to an output of the third means of one of said first and second switching circuits.

4. An arrangement according to claim 3 wherein, within the one of said first and second switching circuits, said fourth means includes means for causing said first means to provide a signal coupling path between that one of said first and second inputs which is coupled to said one of said first and second data links and said output port in response to said third means detecting a prescribed degree of synchronization between signals on said one of said first and second data links and signals at said output port.

5. An arrangement according to claim 4 wherein, within the other of said first and second switching circuits, said fourth means includes means for causing said first means to interrupt a signal coupling path between that one of said first and second inputs which is coupled to the other of said first and second data links and said output port in response to the third means in the one of said first and second switching circuits detecting said prescribed degree of synchronization between signals on said one of said first and second data links and signals at said output port.

6. An arrangement according to claim 4 wherein, said fifth means includes means for controllably delaying signals conveyed in said one of said first and second data links in increments of a fraction of a data unit.

7. An arrangement according to claim 6 wherein, said data signals comprise digital data signals and an increment of delay corresponds to a fraction of a data bit.

8. An arrangement according to claim 7, wherein said fifth means includes a multistage shift register coupled to receive a digital data bit stream coupled over said one of said first and second data links, a multiple output delay means, selectively coupled to one of the stages of said shift register, for producing a plurality of successively delayed versions of the contents of the selected stage of said shift register, and means, coupled to said multiple output delay means, for selectively coupling one of said plurality of successively delayed versions of the contents of the selected stage of said shift register to said one of said data links.

9. An arrangement according to claim 8, wherein said controllably delaying means includes means for sequentially coupling respective stages of said multistage shift register to said multiple output delay means, at a scanning rate corresponding to the bit rate of said digital data signals.

10. An arrangement according to claim 9, wherein said controllably delaying means further includes means for sequentially coupling respective ones of said plurality of successively delayed versions of the contents of the selected stage of said shift register to said one of said data links at a scanning rate corresponding to the inverse of said fraction of a data bit times the bit rate of said digital data signals.

11. An arrangement according to claim 1, wherein said first means comprises a multiplexer having a pair of inputs respectively coupled to the first and second inputs of that switching circuit and an output, and a controlled switch coupled between the output of said multiplexer and said output port, the operation of said controlled switch being controlled by said fourth means.

12. An arrangement according to claim 11, wherein said multiplexer includes means for controlling which one of said first and second inputs is to be selectively coupled to said output port.

13. An arrangement according to claim 12, further comprising summing means having first and second inputs coupled to the outputs of said first and second controlled switching circuits, respectively, and an output coupled to said output port.

14. An arrangement according to claim 13, further comprising signal dividing means, coupled to the output of said summing means, for coupling the signal appearing at said output port to the third means of each of said first and second controlled switching circuits.

15. A digital signal transmission system comprising:

a plurality of normal transmission channels and an auxiliary channel coupled between a transmission station and a receiving station and being capable of conveying digital information signals transmitted by said transmission station to said receiving station;

first means, provided in said auxiliary channel, for imparting a variable delay to signals transmitted thereover;

a plurality of second means, coupled in respective ones of said normal transmission channels, having a first input coupled to receive signals transmitted over its associated normal channel and a second input coupled to the output of said first means, and an output, for selectively coupling the signals at one of said first and second inputs to said output;

a plurality of third means, coupled to respective ones of said second means, for comparing the degree of synchronization of signals at the respective outputs of said second means with signals at one of the first and second inputs thereof; and fourth means, coupled to said second and third means, for causing a selected one of said second means to replace the coupling of signals from one of said first and second inputs to said output with the signals at the other of said first and second inputs to said output in response to the third means that is coupled to said selected one of said second means detecting a prescribed degree of synchronization between signals at the output of said selected second means and signals at said one of the first and second inputs thereof.

16. A digital signal transmission system according to claim 15, wherein said first means comprises means for controllably delaying signals conveyed over said auxiliary channel in increments of a fraction of a data bit.

17. A digital signal transmission system according to claim 15, wherein said first means includes means for controllably delaying signals conveyed over said auxiliary channel until said third means that is coupled to said selected one of said second means detects said prescribed degree of synchronization between signals at the output of said selected second means and signals at said one of the first and second inputs thereof.

18. A digital signal transmission system comprising:

a plurality of normal transmission channels and an auxiliary channel coupled between a transmission station and a receiving station and being capable of conveying digital information signals transmitted by said transmission station to said receiving station;

first means, provided in said auxiliary channel, for imparting a variable delay to signals transmitted thereover;

a plurality of pairs of second means coupled in respective ones of said normal transmission channels, each second means having a first input coupled to receive signals transmitted over its associated normal channel and a second input coupled to the output of said first means, and an output, for selectively coupling the signals at one of said first and second inputs to said output;

a plurality of pairs of third means, coupled to respective pairs of said second means, for comparing the degree of synchronization of signals at the respective outputs of said second means with signals at one of the first and second inputs of respective ones of said second means; and fourth means, coupled to said pairs of second and third means, for causing one of the second means of a selected pair of second means to effect the coupling of delayed signals in the auxiliary channel from said first means applied to the second input of said second means to the output thereof, while simultaneously causing the other of the second means of said selected pair of second means to interrupt the coupling of signals supplied over its associated normal channel applied to the first input of said second means to the output thereof in response to the detecting a prescribed degree of synchronization between the output of said first means and the output of said one of the second means of said selected pair of second means.

19. A digital signal transmission system according to claim 18, wherein said first means comprises means for controllably delaying signals conveyed over said auxiliary channel in increments of a fraction of a data bit.

20. A digital signal transmission system according to claim 18, wherein said first means includes means for controllably delaying signals conveyed over said auxiliary channels until said third means that is coupled to said one of the second means of said selected pair of second means detects said prescribed degree of synchronization between the output of said first means and the output of said one of the second means of said selected pair of second means.

21. A digital signal transmission system according to claim 20, wherein said fourth means includes means for selectively causing said one of the second means of said selected pair of second means to interrupt the coupling of delayed signals in said auxiliary channel from said first means applied to the second input of said second means to the output thereof, while simultaneously causing the other of the second means of said selected pair of second means to effect the coupling of signals supplied over its associated normal channel applied to the first input of said second means to the output thereof.

22. A digital signal transmission system according to claim 21, wherein said first means includes means for gradually changing the delay imparted by said first means to signals conveyed over said auxiliary channel until the third means that is coupled to the other of the second means of said selected pair of second means detects said prescribed degree of synchronization between the output of said first means and the output of said other of the second means of said selected pair of second means.

* * * * *